United States Patent

Yamada et al.

[11] Patent Number: 6,145,560
[45] Date of Patent: Nov. 14, 2000

[54] HEAVY DUTY PNEUMATIC RADIAL TIRES WITH SPECIFIED BELT CUSHION RUBBERS

[75] Inventors: Seiji Yamada; Hiroshi Nakata, both of Kodaira, Japan

[73] Assignee: Bridgestone Corporation, Tokyo, Japan

[21] Appl. No.: 09/266,840

[22] Filed: Mar. 12, 1999

[30] Foreign Application Priority Data

Mar. 12, 1998 [JP] Japan .................................. 10-061536

[51] Int. Cl.$^7$ .................................. B60C 9/18; B60C 9/20
[52] U.S. Cl. ........................ 152/532; 152/527; 152/538
[58] Field of Search .................... 152/532, 538, 152/527

[56] References Cited

U.S. PATENT DOCUMENTS 5,904,197   5/1999   Garlaschelli et al. .............. 152/532 X

*Primary Examiner*—Adrienne C. Johnstone
*Attorney, Agent, or Firm*—Sughrue, Mion, Zinn, Macpeak & Seas, PLLC

[57] ABSTRACT

A heavy duty pneumatic radial tire comprises a radial carcass, a main cross belt and a tread portion, in which the main cross belt is formed by laminating at least three rubberized cord layers so that the cords in each layer are parallel to each other but the cords between the adjoining layers are crossed with each other and extend in opposite directions with respect to an equatorial line of the tire. In such a tire, a pair of cushion rubbers are arranged between the adjoining rubberized cord layers constituting the main cross belt at their both end portions by setting a position relation between mutual cushion rubbers at both belt ends to an optimum value to thereby prevent or control the occurrence of the belt end separation failure.

3 Claims, 1 Drawing Sheet

HEAVY DUTY PNEUMATIC RADIAL TIRES WITH SPECIFIED BELT CUSHION RUBBERS

BACKGROUND OF THE INVENTION

1. Field of the Invention

This invention relates to a heavy duty pneumatic radial tire, and more particularly to a heavy duty pneumatic radial tire comprising a radial carcass of a rubberized cord ply extending between a pair of bead cores and turned around each bead core from inside of the tire toward outside thereof. A belt is superimposed about a crown portion of the carcass on an outer peripheral surface thereof and comprised of a main cross belt and a tread portion, in which the main cross belt is formed by laminating at least three rubberized cord layers each containing a plurality of substantially inextensible metal cords therein so that the cords in each layer are parallel to each other but the cords between the adjoining layers are crossed with each other and extend in opposite directions with respect to an equatorial line of the tire.

2. Description of Related Art

In general, it is apt to cause separation failure at belt end in the heavy duty pneumatic tires representing a pneumatic tire for construction vehicle provided with the main cross belt as mentioned above. This separation failure at belt end is caused by rubber fatigue at the belt end due to interlaminar shearing strain based on an air pressure of the tire and dynamic interlaminar shearing strain applied by load applied to the tire, driving force, braking force, lateral force and the like.

In order to prevent such a belt end separation failure, in the conventional heavy duty pneumatic radial tire having the main cross belt, a pair of cushion rubbers are arranged at both belt ends to cover both end portions of rubberized cord layers between adjoining cord layers forming the main cross belt, but special consideration is not made with respect to a position relation between the mutual cushion rubbers at both belt ends. As a result, the shearing strain between the rubberized cord layer constituting the main cross belt and the cushion rubber at the belt end is rather increased and there may frequently be caused an inconvenience of facilitating the occurrence of the belt end separation failure.

SUMMARY OF THE INVENTION

It is, therefore, an object of the invention to solve the afore-mentioned drawbacks of the conventional tire and to provide a heavy duty pneumatic radial tire having an excellent resistance to separation at belt end by setting an optimum position relation between mutual cushion rubbers at both belt ends to prevent or control the occurrence of the belt end separation failure.

According to the invention, there is the provision of a heavy duty pneumatic radial tire comprising a radial carcass of a rubberized cord ply extending between a pair of bead cores and turned around each bead core from inside of the tire toward outside thereof, a belt superimposed about a crown portion of the carcass on an outer peripheral surface thereof and comprised of a main cross belt and a tread portion, in which the main cross belt is formed by laminating at least three rubberized cord layers each containing a plurality of substantially inextensible metal cords therein so that the cords in each layer are parallel to each other but the cords between the adjoining layers are crossed with each other and extend in opposite directions with respect to an equatorial line of the tire, in which (1) a pair of cushion rubbers are arranged between the adjoining rubberized cord layers constituting the main cross belt at their both end portions; (2) mutual cushion rubbers arranged at each belt end and most approaching to each other in a widthwise direction of the tire among these cushion rubbers are partly overlapped with each other in the widthwise direction of the tire; and (3) a distance d between ends of such mutual cushion rubbers facing an equatorial line of the tire in the widthwise direction of the tire is not less than 1.5% of a section width W of the main cross belt.

In a preferable embodiment of the invention, an outermost cushion rubber and innermost cushion rubber arranged at outermost and innermost sides in a radial direction of the tire among the cushion rubbers are partly overlapped with each other in the widthwise direction of the tire at each end portion of the belt and a distance D between ends of the outermost cushion rubber and innermost cushion rubber facing the equatorial line of the tire in the widthwise direction is not less than 1.5% of the section width W of the main cross belt.

In another preferable embodiment of the invention, an effective belt width of the main cross belt is 20–75% of a tread width.

In the tire according to the invention, the cushion rubber is effective to have a wedge-shaped section, but if an effective thickness is ensured, a sheet-shaped cushion rubber may be used.

The term "main cross belt" used herein means belt layers formed by laminating plural rubberized cord layers each containing a plurality of substantially inextensible metal cords embedded in a coating rubber so as to cross the cords of the adjoining layers with each other. Thus, the main cross belt serves to bear tension in the circumferential direction produced by the inflation of an inner pressure in the tire to maintain a section of the tire at a given shape.

In the heavy duty pneumatic radial tire according to the invention, the belt may be only the above main cross belt, but a protection belt layer for protecting the main cross belt may be laminated on the outside of the main cross belt in the radial direction, if necessary. The protection belt layer is made from at least one rubberized cord layer containing a plurality of substantially extensible metal cords embedded in a coating rubber. Since the protection belt layer serves to protect the main cross belt, it is usual to use the rubberized cord layer having a width wider than that of the main cross belt.

The term "substantially inextensible metal cord" used herein means a metal cord having an elongation at break (Eb) of 1–3%. The term "substantially extensible metal cord" used herein means a metal cord having an elongation at break (Eb) of 4–7%.

The term "section width of belt" used herein means a section width of a belt at a section including a rotating axis of the tire. The term "effective belt width" used herein means a maximum width of the cross belt when the adjacent cord layers are laminated so as to cross the cords of these layers in opposite directions with respect to the equatorial line of the tire and hence corresponds to a width of a rubberized cord layer having a second wider width among the rubberized cross cord layers other than a rubberized cord layer having the same cord direction with respect to the equatorial line.

The separation failure at belt end is caused at an end of the belt and progresses in the circumferential direction of the tire and toward the inside of the tire. The reason why the separation failure starts from the belt end is due to the fact that the interlaminar shearing strain in the circumferential direction increases near to the belt end and becomes maximum at the belt end.

In the pneumatic radial tire according to the invention, (1) a pair of cushion rubbers are arranged between the adjoining rubberized cord layers constituting the main cross belt at their both end portions; (2) mutual cushion rubbers arranged at each belt end and most approaching to each other in a widthwise direction of the tire among these cushion rubbers are partly overlapped with each other in the widthwise direction of the tire; and (3) a distance d between ends of such mutual cushion rubbers facing an equatorial line of the tire in the widthwise direction of the tire is not less than 1.5% of a section width W of the main cross belt, so that it is particularly effective to control the progress of the separation failure created at the belt end toward the inside of the tire.

When a load is applied to the tire, a maximum load is usually produced in the vicinity of the equatorial plane of the tire, whereby rubber is moved from a central side toward a shoulder side of the tire and the movement of rubber toward the shoulder side at the belt end is particularly large and hence the interlaminar shearing strain in the rotating axial direction of the tire becomes large. Such a large interlaminar shearing strain in the rotating axial direction promotes the progress of the separation failure produced at the belt end toward the inside of the tire.

When the distance d between the ends of the mutual cushion rubbers facing an equatorial line of the tire in the widthwise direction of the tire is very small, the point of a lever where force is applied in the radial direction is coincident between the rubberized cord layers arranged adjacent to these cushion rubbers at the outside and inside thereof in the radial direction. The moving quantity of rubber becomes large and hence the interlaminar shearing strain at the belt end is large to promote the progress of the separation failure produced at the belt end toward the inside of the tire. And also, the belt end is compressed in the radial direction to push up the end portion of the cushion rubber facing the equatorial line through the action of lever, whereby the progress of the separation failure is promoted toward the inside of the tire and as a result, there may be caused the separation failure even at this position under a certain circumstance.

In the pneumatic radial tire according to the invention, the distance d between the ends of the mutual cushion rubbers facing an equatorial line of the tire in the widthwise direction of the tire is sufficiently large and is not less than 1.5% of the section width W of the main cross belt as previously mentioned. The rubberized cord layers arranged adjacent to these cushion rubbers at the outside and inside thereof in the radial direction do not push up to each other. Therefore, the movement of rubber at the belt end is controlled and also the progress of the belt end separation failure toward the inside of the tire is controlled. Furthermore, the aforementioned phenomenon that the belt end is compressed in the radial direction to push up the end portion of the cushion rubber facing the equatorial line through the action of lever is hardly caused.

In the tire according to the invention, it is favorable that the effective belt width of the main cross belt is 20–75% of a tread width. When the effective belt width is within a range of the 20–75% of the tread width, a large force is easily applied to the cushion rubber located at the belt end.

BRIEF DESCRIPTION OF THE DRAWINGS

The invention will be described with reference to the accompanying drawings, wherein.

DESCRIPTION OF PREFERRED EMBODIMENTS

Figure 3:
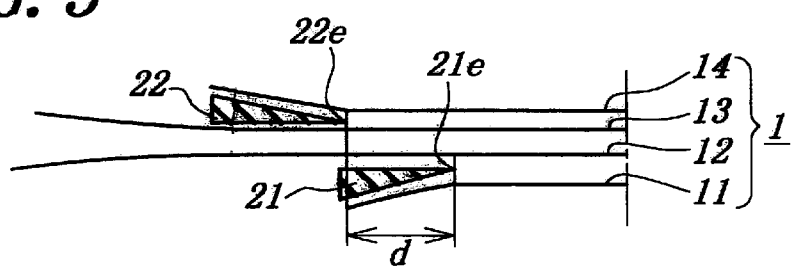
FIG. 3 is a left-half sectional schematic view of a third embodiment illustrating the belt arrangement of the heavy duty pneumatic radial tire according to the invention.
Figure 4:
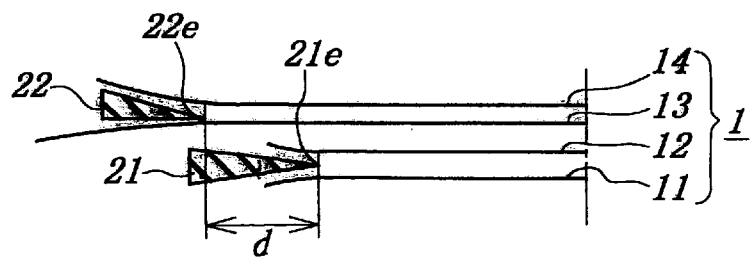
FIG. 4 is a left-half sectional schematic view of a fourth embodiment illustrating the belt arrangement of the heavy duty pneumatic radial tire according to the invention.
Figure 5:
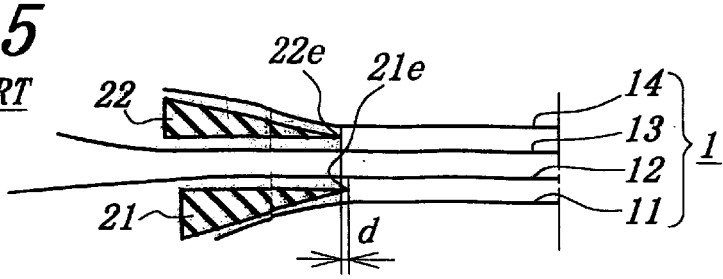
FIG. 5 is a left-half sectional schematic view of the belt arrangement of a conventional heavy duty pneumatic radial tire.

FIGS. 1 to 4 show various embodiments of the main cross belt arrangement in the pneumatic radial tire for construction vehicle according to the invention, while FIG. 5 shows the main cross belt arrangement of the conventional pneumatic radial tire. Each of these tires has a tire size of 37.00R57.

Figure 1:
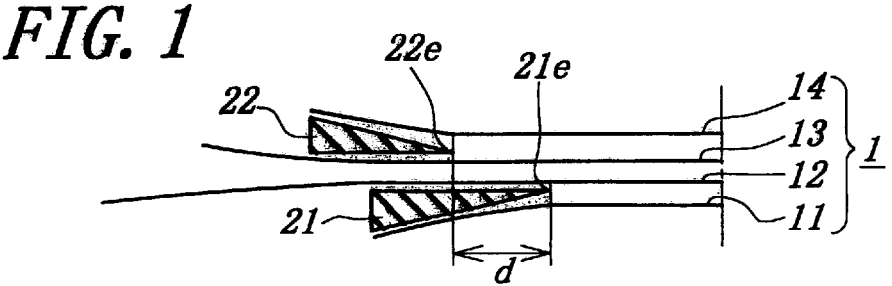
FIG. 1 is a left-half sectional schematic view of a first embodiment illustrating the belt arrangement of the heavy duty pneumatic radial tire according to the invention.

A tire of Example 1 shown in FIG. 1 comprises a pair of bead cores (not shown) embedded in a pair of bead portions, a radial carcass (not shown) of a rubberized cord ply extending between the bead cores and turned around each bead core from inside of the tire toward outside thereof, a belt superimposed about a crown portion of the carcass on an outer peripheral surface thereof and comprised of a main cross belt 1 and a tread portion (not shown).

The main cross belt 1 is formed by laminating four rubberized cord layers 11, 12, 13, 14 each containing a plurality of substantially inextensible steel cords having an elongation at break of 2% and embedded in a coating rubber so that the cords in each layer are parallel to each other but the cords between the adjoining layers are crossed with each other and extend in opposite directions with respect to an equatorial line of the tire and the cord inclination angles with respect to the circumferential direction are 25° upward to the left, 25° upward to the right, 19° upward to the left and 19° upward to the right, respectively. The section widths of the four rubberized cord layers 11, 12, 13, 14 constituting the main cross belt 1 are 470 mm, 690 mm, 600 mm and 550 mm, respectively.

The tire of Example 1 further comprises a protection belt layer (not shown) disposed on the outside of the main cross belt 1 which is composed of the four rubberized cord layers 11, 12, 13, 14 in the radial direction and comprised of a single rubberized cord layer containing a plurality of substantially extensible steel cords having an elongation at break of 5% embedded in a coating rubber. The section width of the protection belt layer is 710 mm.

Each of a pair of cushion rubbers 21, 22 are arranged at both end portions of the rubberized cord layers 11, 12, 13 and 14 constituting the main cross belt 1 between the adjacent layers 11 and 12 and between the adjacent layers 13 and 14, respectively.

The mutual cushion rubbers 21, 22 arranged at each belt end and most approaching to each other in a widthwise direction of the tire among these cushion rubbers are partly overlapped with each other in the widthwise direction of the tire.

The distance d between ends 21e, 22e of the mutual cushion rubbers 21, 22 facing an equatorial line of the tire in the widthwise direction of the tire is 30 mm, which corresponds to 4.3% of a section width W (=690 mm) of the main cross belt 1.

In the tire of Example 1, the outermost cushion rubber and innermost cushion rubber arranged at outermost side and innermost side in the radial direction correspond to the mutual cushion rubbers 21, 22 most approaching to each other in the widthwise direction of the tire. Therefore, the distance D between the ends of the outermost and innermost cushion rubbers facing the equatorial line in the widthwise direction of the tire is the same as the aforementioned distance d.

The effective belt width of the main cross belt 1 is 600 mm, which corresponds to 70% of a tread width (=852 mm).

Figure 2:
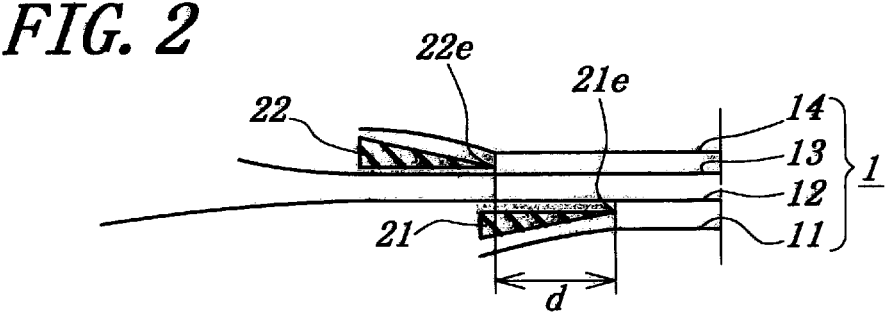
FIG. 2 is a left-half sectional schematic view of a second embodiment illustrating the belt arrangement of the heavy duty pneumatic radial tire according to the invention.

A tire of Example 2 shown in FIG. 2 is substantially the same as in the tire of Example 1 except that four rubberized cord layers 11, 12, 13, 14 constituting the main cross belt 1 are laminated to have cord inclination angles of 25° upward to the left, 25° upward to the right, 15° upward to the left and 15° upward to the right with respect to the circumferential direction, respectively, and the section widths of the four rubberized cord layers 11, 12, 13, 14 are 350 mm, 690 mm, 580 mm and 440 mm, respectively, and the distance d between ends 21e, 22e of the mutual cushion rubbers 21, 22 facing the equatorial line in the widthwise direction of the tire is 50 mm corresponding to 7.2% of the section width W (=690 mm) of the main cross belt 1, and the effective belt width of the main cross belt 1 is 580 mm corresponding to 68% of the tread width (=852 mm).

A tire of Example 3 shown in FIG. 3 is substantially the same as in the tire of Example 1 except that four rubberized cord layers 11, 12, 13, 14 constituting the main cross belt 1 are laminated to have cord inclination angles of 66° upward to the right, 18° upward to the left, 18° upward to the right and 38° upward to the left with respect to the circumferential direction, respectively, and the section widths of the four rubberized cord layers 11, 12, 13, 14 are 450 mm, 660 mm, 640 mm and 580 mm, respectively, and the distance d between ends 21e, 22e of the mutual cushion rubbers 21, 22 facing the equatorial line in the widthwise direction of the tire is 38 mm corresponding to 5.8% of the section width W (=660 mm) of the main cross belt 1, and the effective belt width of the main cross belt 1 is 640 mm corresponding to 75% of the tread width (=852 mm).

A tire of Example 4 shown in FIG. 4 is substantially the same as in the tire of Example 1 except that four rubberized cord layers 11, 12, 13, 14 constituting the main cross belt 1 are laminated to have cord inclination angles of 15° upward to the right, 15° upward to the left, 37° upward to the right and 22° upward to the left with respect to the circumferential direction, respectively, and the section widths of the four rubberized cord layers 11, 12, 13, 14 are 350 mm, 300 mm, 600 mm and 460 mm, respectively, and the distance d between ends 21e, 22e of the mutual cushion rubbers 21, 22 facing the equatorial line in the widthwise direction of the tire is 40 mm corresponding to 6.7% of the section width W (=600 mm) of the main cross belt 1, and the effective belt width of the main cross belt 1 is 460 mm corresponding to 54% of the tread width (=852 mm).

The conventional tire shown in FIG. 5 is substantially the same as in the tire of Example 1 except that the distance d between ends 21e, 22e of the mutual cushion rubbers 21, 22 facing the equatorial line in the widthwise direction of the tire is 4 mm corresponding to 0.6% of the section width W (=690 mm) of the main cross belt 1.

With respect to the tires of these examples and conventional example, a test for evaluating the separation resistance (or resistance to separation failure at belt end) is carried out as follows:

The tire to be tested is inflated under an inner pressure of 7.00 kgf/cm$^2$ and run an indoor drum testing machine at a speed of 15 km/h under a load of 51,500 kg for a given time, and thereafter a separation length is measured to obtain results as shown in Table 1. The result is represented by an index on the basis that the conventional tire is 100. The smaller the index value, the shorter the separation length and the better the separation resistance.

TABLE 1

|  | Conventional Example | Example 1 | Example 2 | Example 3 | Example 4 |
|---|---|---|---|---|---|
| Separation resistance between layers 11 and 12 | 100 | 96 | 89 | 97 | 94 |
| Separation resistance between layers 12 and 13 | 100 | 100 | 99 | 100 | 76 |
| Separation resistance between layers 13 and 14 | 100 | 88 | 67 | 91 | 100 |

As seen from the results of table 1, the heavy duty pneumatic radial tires according to the invention are excellent in the resistance to separation failure at belt end as compared with the conventional heavy duty pneumatic radial tire.

What is claimed is:

1. A heavy duty pneumatic radial tire comprising a radial carcass of a rubberized cord ply extending between a pair of bead cores and turned around each bead core from inside of the tire toward outside thereof, a belt superimposed about a crown portion of the carcass on an outer peripheral surface thereof and comprised of a main cross belt and a tread portion, in which the main cross belt is formed by laminating at least three rubberized cord layers each containing a plurality of substantially inextensible metal cords therein so that the cords in each layer are parallel to each other but the cords between the adjoining layers are crossed with each other and extend in opposite directions with respect to an equatorial line of the tire, in which (1) a pair of cushion rubbers are arranged between the adjoining rubberized cord layers constituting the main cross belt at their both end portions; (2) mutual cushion rubbers arranged at each belt end and most approaching to each other in a widthwise direction of the tire among these cushion rubbers are partly overlapped with each other in the widthwise direction of the tire; and (3) a distance d between ends of such mutual cushion rubbers facing an equatorial line of the tire in the widthwise direction of the tire is not less than 1.5% of a section width W of the main cross belt.

2. A heavy duty pneumatic radial tire according to claim 1, wherein an outermost cushion rubber and innermost cushion rubber arranged at outermost and innermost sides in a radial direction of the tire among the cushion rubbers are partly overlapped with each other in the widthwise direction of the tire at each end portion of the belt and a distance D between ends of the outermost cushion rubber and innermost cushion rubber facing the equatorial line of the tire in the widthwise direction is not less than 1.5% of the section width W of the main cross belt.

3. A heavy duty pneumatic radial tire according to claim 1, wherein an effective belt width of the main cross belt is 20–75% of a tread width.

* * * * *